Patented Apr. 4, 1944

2,345,957

UNITED STATES PATENT OFFICE 2,345,957

PROCESS FOR THE PRODUCTION OF HYDROCARBONS

Gustav Wirth and Hans Laudenklos, Leuna, Germany; vested in the Alien Property Custodian No Drawing. Application August 22, 1940, Serial No. 353,655. In Germany September 5, 1939

2 Claims. (Cl. 260—449.6)

The present invention relates to the conversion of carbon monoxide and hydrogen into hydrocarbons containing more than one carbon atom in the molecule.

It has already been proposed to withdraw the surplus heat evolved in the said conversion by passing the reacting gases very rapidly through the reaction space and then recycling the major portion of these gases after cooling them to the temperature prevailing at the entrance of this space.

We have now found that the said conversion may be carried out in a very advantageous manner by recycling the gas issuing from the reaction space in an amount corresponding to a multiple of the amount of fresh gas and preferably to at least four or five times the volume of fresh gas while avoiding substantial cooling and without separating therefrom liquid or solid products formed by the conversion, the surplus heat evolved by the conversion being simultaneously withdrawn through the walls of the reaction space by means of a cooling liquid contacting these walls. When working in this manner, the recycled gas has practically the same temperature at the outlet from the catalytic space as it has at the entrance thereof and therefore does not serve for the withdrawal of the surplus reaction heat as in the above mentioned known process. According to our manner of working, the yield of the desired hydrocarbons is considerably increased (by up to about 40%) as compared with the hitherto known operations. This result is very surprising, since the average duration of sojourn of the reacting gases in the catalyst space is about the same as when subjecting them, undiluted with reaction products, to a single-pass conversion.

A condensation of the liquid and solid reaction products which are present in vapor form in the recycled gases and a fall of the temperature of the gases may easily be avoided by the use of heated pipes. Since the reaction gases cannot be converted completely into desirable products and in order to remove the desired products, it is not possible to recycle the whole amount of the gas issuing from the reaction space, but a partial stream corresponding about to the amount of fresh gas (minus the decrease in volume occurring by the conversion) must be branched off continuously or at intervals, and this portion is then freed from the desired liquid and solid products formed or is introduced into a further reaction space.

The conversion may be carried out under the usual conditions, i. e. at temperatures between about 150° and 370° C. and under atmospheric or superatmospheric pressures. The conversion may be effected in one or several stages. In the latter case the same or different conditions, for example the same or different temperatures, pressures and catalysts may be employed in the single stages.

The gases employed for the synthesis may be prepared in any desired manner, for example by gasification of solid fuels, such as coke, mineral coal, brown coal or less valuable fuels, or by the conversion of natural gas or other gases containing methane with steam or carbon dioxide or by incomplete combustion of such gases.

Likewise various catalysts may be employed, for example those prepared by reducing molten ferrosoferric oxide containing suitable additions (as for example substances containing silicon and/or titanium), or catalysts containing iron prepared by heating to such high temperatures (but below the melting point of the substance treated or resulting therefrom) and for such a long time that sintering occurs, or mixtures of cobalt with activating substances, for example thorium oxide or magnesium oxide, preferably on carriers, as for example kieselguhr or kaolin, or catalysts containing nickel, or mixtures of the said catalysts.

The catalyst space may be constructed in any desired and suitable manner, for example as a synthesis chamber in which the catalyst is arranged between plates through which the cooling medium flows, or as a synthesis chamber comprising a bundle of tubes which are filled with the catalyst. In any case the catalyst space must be so constructed that the surplus heat evolved by the conversion may be withdrawn sufficiently rapidly by indirect heat exchange with a cooling medium contacting the walls of the reaction space while maintaining constant or practically constant temperatures in this space.

The following example will further illustrate the nature of the present invention, but the invention is not restricted to this example.

*Example*

A gas containing 28 per cent of carbon monoxide and 65 per cent of hydrogen (the remainder consisting of inert constituents) is passed in one stage at about 185° C. over a cobalt-thorium-oxide catalyst which has been arranged in a suitable bundle of tubes (the tubes having a diameter of 15 millimeters). From the gas leaving the reaction space an amount corresponding to the fivefold of the amount of fresh gas is recycled by passage through heated pipes, but without substantial change in temperature, into the catalyst space. The linear velocity of flow of the gas in the catalyst space amounts to 60 centimeters per second. From the remaining portion of the gases issuing from the reaction space the liquid and solid hydrocarbons formed are separated off. The yield of these hydrocarbons amounts to 138 grams per each cubic meter of so-called ideal gas (cubic meters of a mixture of one part of carbon monoxide with 2 parts of hydrogen measured at atmospheric pressure and temperature) as compared with only 100 grams per cubic meter when passing the gases in only one throughput over the catalyst. In this manner an increase of the yield of the desired hydrocarbons amounting to 38 per cent is obtained.

What we claim is:

1. A process for the conversion of carbon monoxide and hydrogen into hydrocarbons containing more than one carbon atom in the molecule in which a fixed catalyst is used and the surplus heat evolved by the conversion is removed by indirect heat exchange with a cooling fluid contacting the walls of the reaction space, which comprises recycling the gas issuing from the reaction space in an amount corresponding to about five times the amount of fresh mixture of carbon monoxide and hydrogen while avoiding substantial cooling and condensation of reaction products contained therein so that the recycled gas has practically the same temperature at the outlet of the catalytic space as it has at the entrance thereof, and branching off a portion corresponding to about the amount of added fresh gas mixture for recovering the desired products therefrom.

2. In a process for the conversion of carbon monoxide and hydrogen into hydrocarbons containing more than one carbon atom in the molecule in which a fixed catalyst is used, and gas issuing from the reaction space is recycled, the volume of said gas recycled per unit of time being substantially larger than the volume of fresh gas introduced into the catalyst space per unit of time while branching off a portion from the gas issuing from the reaction space corresponding to about the amount of added fresh gas mixture for recovering the desired products, the improvement which comprises maintaining the ratio of gas recycled about 4 to 5 times the amount of fresh gas and removing the surplus heat evolved by the conversion by indirect heat exchange with a cooling fluid contacting the walls of the reaction space, so that the recycled gas has practically the same temperature at the outlet and entrance of the reaction space.

GUSTAV WIRTH.
HANS LAUDENKLOS.